United States Patent
Yamashita et al.

(10) Patent No.: US 9,043,520 B2
(45) Date of Patent: May 26, 2015

(54) INTERRUPT CONTROL METHOD AND MULTICORE PROCESSOR SYSTEM

(71) Applicant: FUJITSU LIMITED, Kawasaki-shi, Kanagawa (JP)

(72) Inventors: Koichiro Yamashita, Hachioji (JP); Hiromasa Yamauchi, Kawasaki (JP); Takahisa Suzuki, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 311 days.

(21) Appl. No.: 13/750,759

(22) Filed: Jan. 25, 2013

(65) Prior Publication Data

US 2013/0138850 A1     May 30, 2013

Related U.S. Application Data

(63) Continuation of application No. PCT/JP2010/062626, filed on Jul. 27, 2010.

(51) Int. Cl.
*G06F 13/24* (2006.01)
*G06F 9/48* (2006.01)
*G06F 12/08* (2006.01)

(52) U.S. Cl.
CPC ............ *G06F 13/24* (2013.01); *G06F 12/0815* (2013.01); *G06F 9/4812* (2013.01)

(58) Field of Classification Search
USPC .................................................. 710/260–269
See application file for complete search history.

(56) References Cited

U.S. PATENT DOCUMENTS

| | | | | |
|---|---|---|---|---|
| 5,446,841 | A  * | 8/1995 | Kitano et al. ................. | 709/213 |
| 6,324,600 | B1 * | 11/2001 | Brice et al. ..................... | 710/33 |
| 6,535,942 | B1 * | 3/2003 | Karlsson et al. .............. | 710/260 |
| 6,983,339 | B1 * | 1/2006 | Rabe et al. .................... | 710/260 |
| 7,418,557 | B2 * | 8/2008 | Blinick et al. ................ | 711/141 |
| 8,176,262 | B2 * | 5/2012 | Dave et al. .................... | 711/146 |
| 8,312,198 | B2 * | 11/2012 | Tiruvallur et al. ............ | 710/268 |
| 8,402,172 | B2 * | 3/2013 | Muppirala et al. ................ | 710/5 |
| 8,645,596 | B2 * | 2/2014 | Kumar et al. ................... | 710/52 |
| 2005/0198422 | A1 * | 9/2005 | Galbraith et al. ............. | 710/260 |
| 2006/0117147 | A1 | 6/2006 | Blinick et al. | |
| 2008/0091884 | A1 | 4/2008 | Piry et al. | |

(Continued)

FOREIGN PATENT DOCUMENTS

| | | |
|---|---|---|
| JP | 10-171770 A | 6/1998 |
| JP | 2001-236238 A | 8/2001 |
| JP | 2006-338184 A | 12/2006 |

(Continued)

*Primary Examiner* — Raymond Phan
(74) *Attorney, Agent, or Firm* — Arent Fox LLP

(57) ABSTRACT

In an interrupt control method of a multicore processor system including cores, a cache coherency mechanism, and a device, a first core detecting an interrupt signal from the device writes into an area prescribing an interrupt flag in the cache memory of the first core, first data indicating detection of the interrupt signal, and notifies the other cores of an execution request for interrupt processing corresponding to the interrupt signal, consequent to the cache coherency mechanism establishing coherency among at least cache memories of the other cores when the first data is written; and a second core different from the first core, maintaining the first data written as the interrupt flag, and notified of the execution request executes the interrupt processing, and writes over the area prescribing the interrupt flag written in the cache memory of the second core, with second data indicating no-detection of the interrupt signal.

5 Claims, 7 Drawing Sheets

(56) References Cited

U.S. PATENT DOCUMENTS

2011/0072180 A1* 3/2011 Lee .............................. 710/260
2011/0145461 A1* 6/2011 Zhao et al. ................... 710/267
2013/0019032 A1* 1/2013 Han et al. ...................... 710/22

FOREIGN PATENT DOCUMENTS

| | | |
|---|---|---|
| JP | 2008-140191 A | 6/2008 |
| JP | 2008-522264 A | 6/2008 |
| JP | 2010-507160 A | 3/2010 |

* cited by examiner

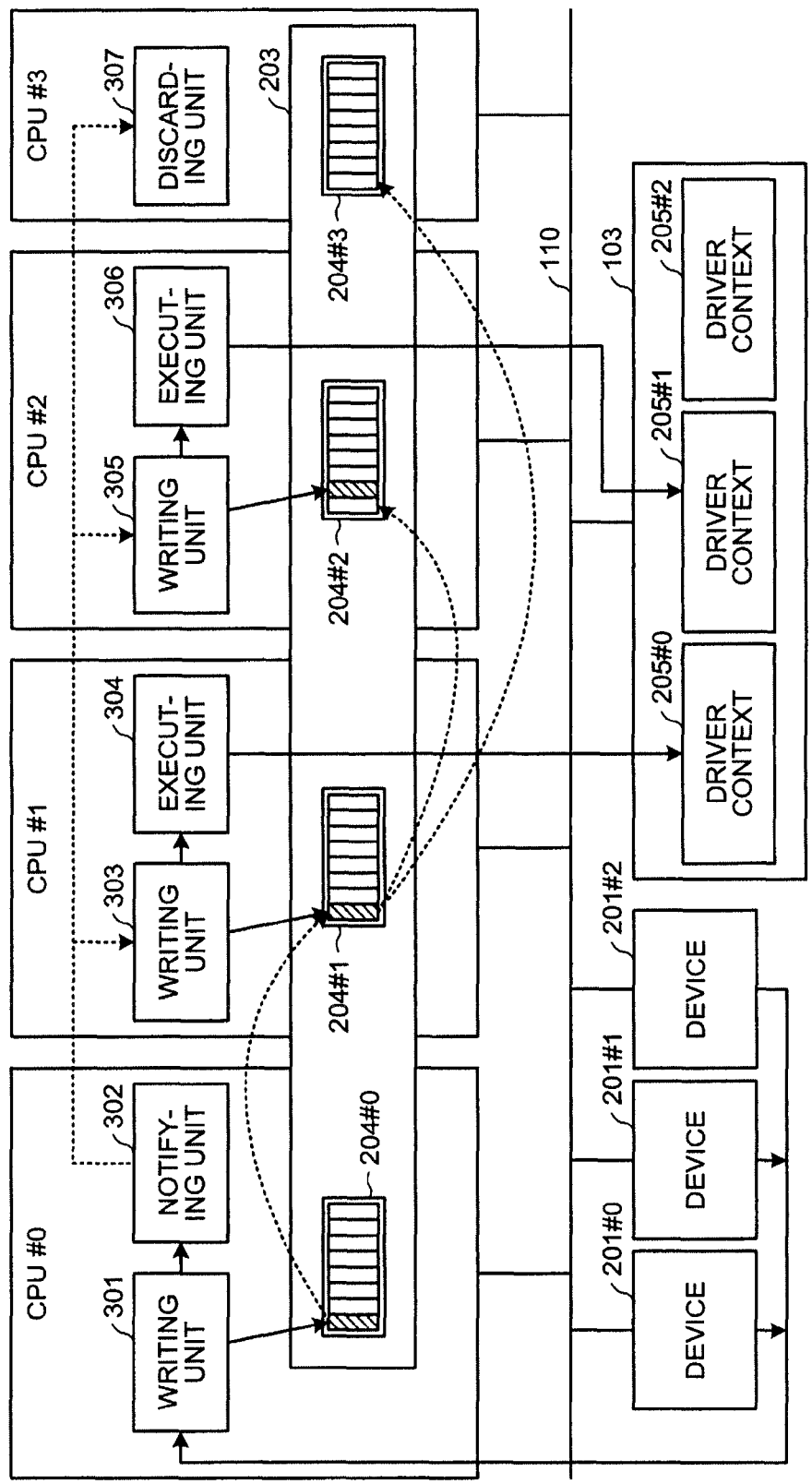

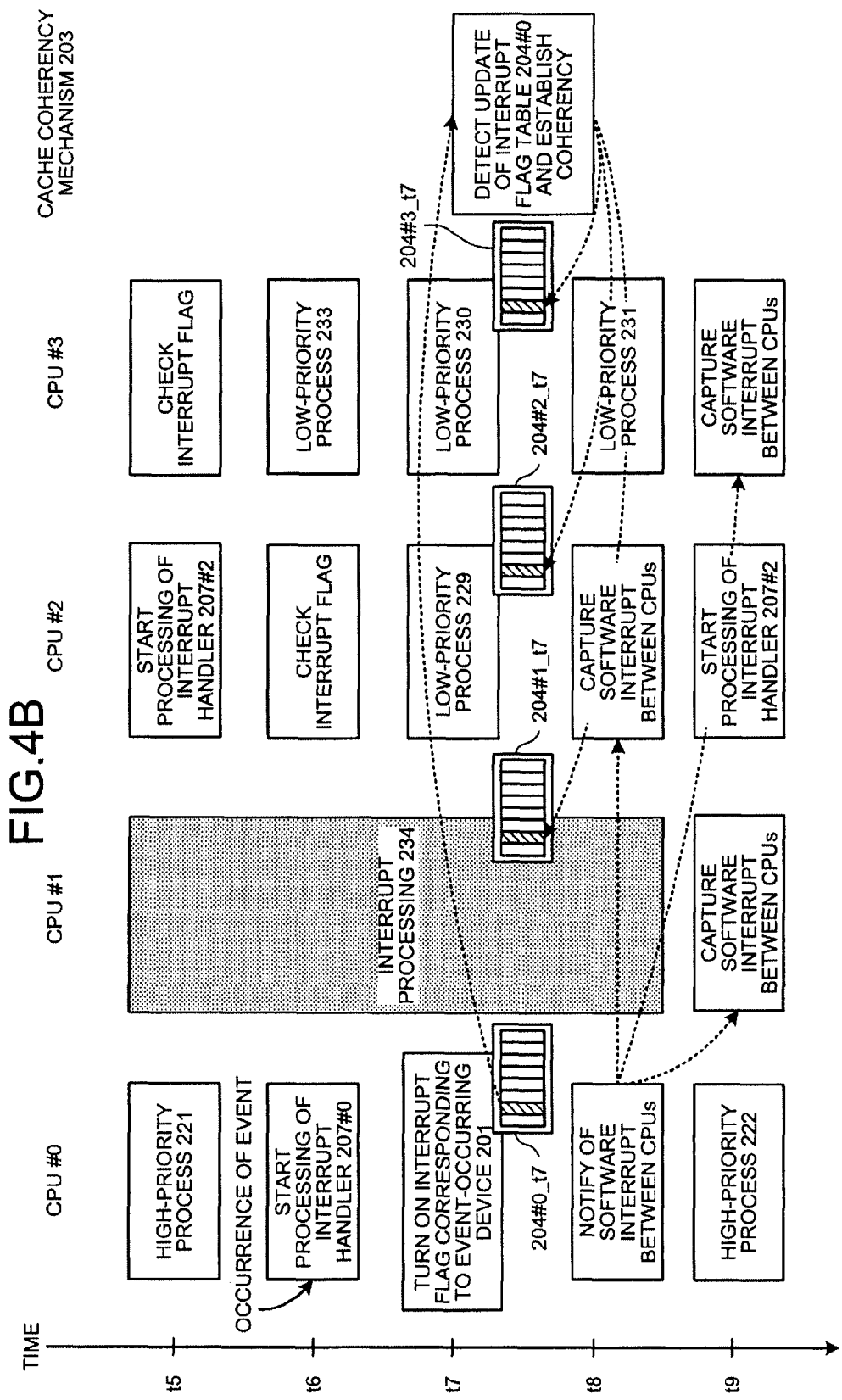

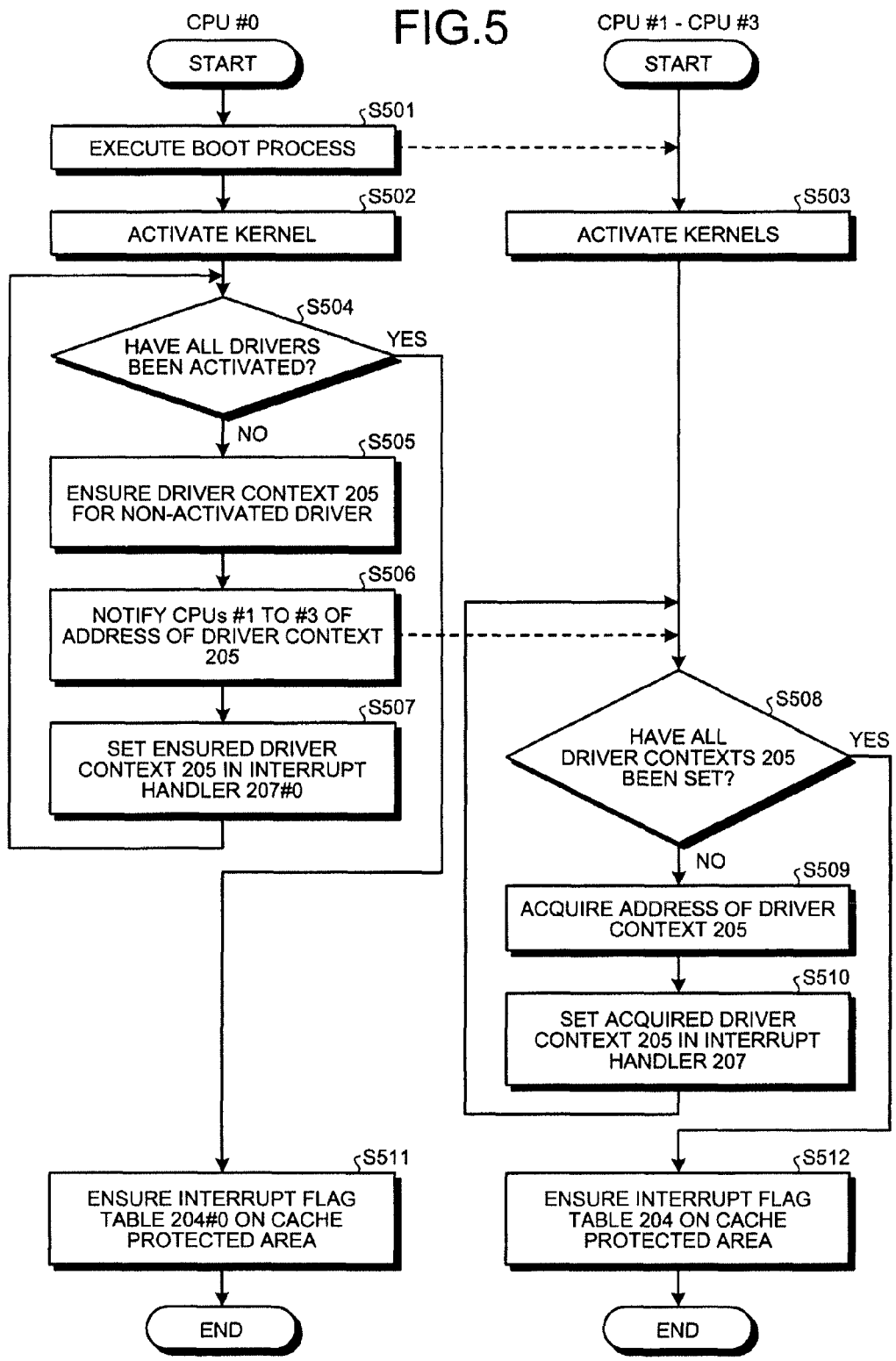

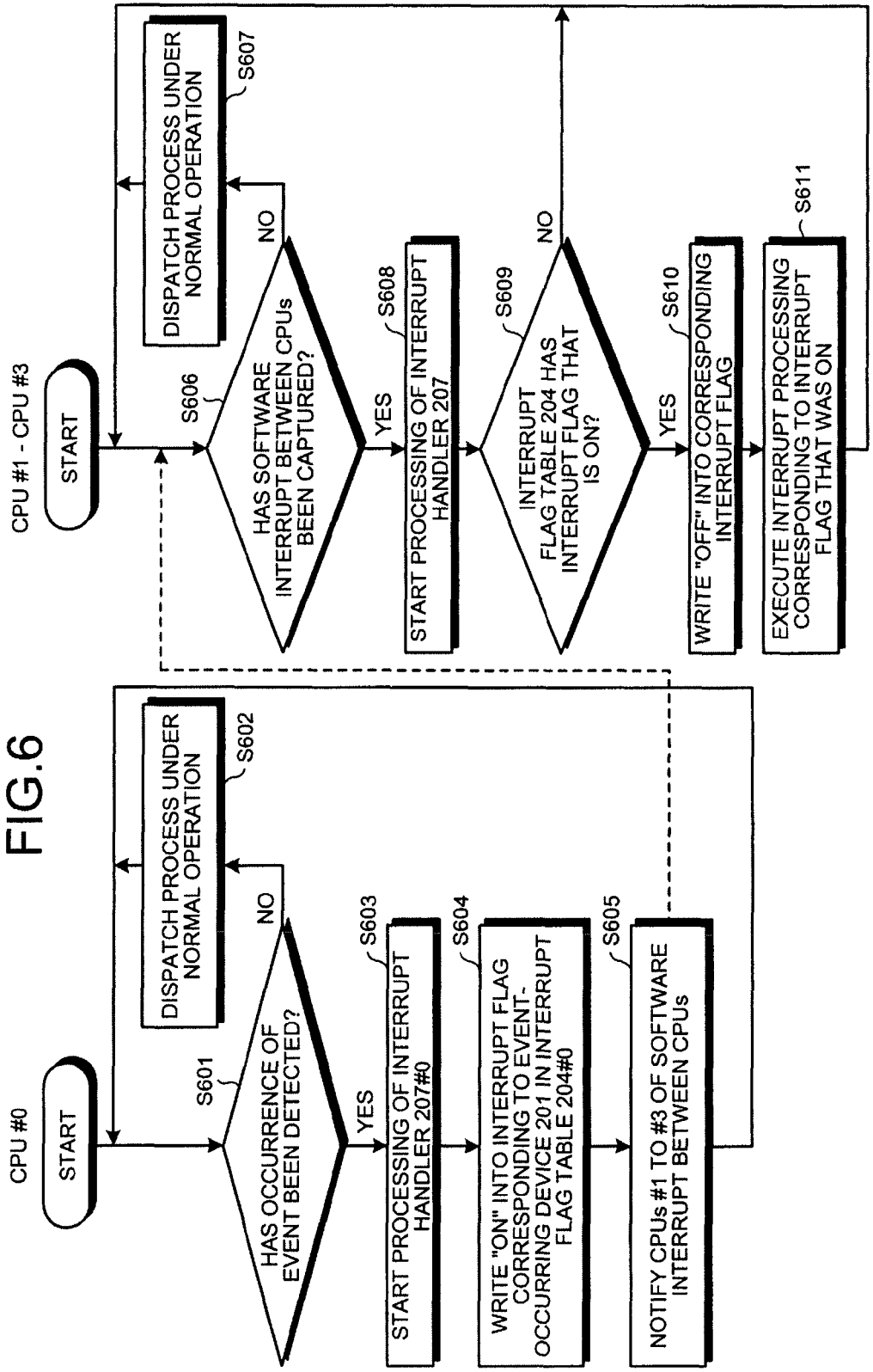

INTERRUPT CONTROL METHOD AND MULTICORE PROCESSOR SYSTEM

CROSS REFERENCE TO RELATED APPLICATIONS

This application is a continuation application of International Application PCT/JP2010/062626, filed on Jul. 27, 2010 and designating the U.S., the entire contents of which are incorporated herein by reference.

FIELD

The embodiments discussed herein are related to an interrupt control method, a multicore processor system, and an interrupt control program controlling interrupt processing.

BACKGROUND

A conventional technique exists where in a computer system, processing corresponding a device is executed at high speed by saving a process under execution by a central processing unit (CPU) in response to an interrupt signal from the device and by executing interrupt processing for the interrupt signal. Processing corresponding to the device is referred to as a device driver and device driver operations include a single-operation type driver executing one process for one interrupt signal and a continuous-operation type driver continuously executing processes for one interrupt signal.

The single-operation type driver makes a change to a software-friendly interface in response to a register set operation of a device. The single-operation type driver corresponds to a driver of a keyboard and a driver of a mouse, for example. The continuous-operation type driver sets direct memory access (DMA) to perform data transfer in response to an interrupt signal for a depletion or a buffer-full state of a buffer managed by First-In, First-Out (FIFO). The continuous-operation type driver corresponds to a driver of a display and a driver of a camera, for example.

The continuous-operation type drivers often have a deadline set by specifications for given data subject to the data transfer. For example, if a display is refreshed at 60 [Hz], the driver of the display has a specification of transferring data within a deadline of about 0.017 [seconds].

With regard to the form of implementation of interrupt processing in a multicore processor system equipped with multiple CPUs, for example, the interrupt processing is placed entirely on a master CPU among the CPUs and the master CPU executes all of the interrupt processing in one implementation form (this form will hereinafter be referred to as a conventional technique 1). In another form of implementation, the interrupt processing is distributed among CPUs and each of the CPUs executes the interrupt processing (this form will be referred to as a conventional technique 2).

For example, with regard to the conventional technique 2, a technique is disclosed where each CPU has a driver executing the interrupt processing and when interrupt occurs, the drivers arbitrate CPUs executing the interrupt processing (see, e.g., Japanese Laid-Open Patent Publication No. 2006-338184).

In another technique, for example, each CPU refers to a table having as a data structure, addresses of functions acting as interrupt processing and each CPU utilizes a semaphore mechanism of an operating system (OS) for using exclusion to execute the interrupt processing. A technique is disclosed that produces a memory saving effect in this way without placing the interrupt processing on all the CPUs (see, e.g., Japanese Laid-Open Patent Publication No. 2008-140191).

However, in the conventional techniques described above, the conventional technique 1 has a problem in that when the interrupt processing concentrates on the master CPU, the concentration of load causes the interrupt processing to exceed the period of time in which the interrupt processing should be processed, reducing response performance in real-time processing. The conventional technique 2 has a problem in that when an interrupt signal is generated, a sorting process is generated to determine which CPU executes the interrupt processing corresponding to the generated interrupt signal. The conventional technique according to Japanese Laid-Open Patent Publication No. 2008-140191 also has a problem in that although each CPU can execute the interrupt processing, the assignment of the interrupt processing to a CPU with a higher load may cause the interrupt processing to exceed the period of time in which the interrupt processing should be processed, reducing the response performance.

SUMMARY

According to an aspect of an embodiment, in an interrupt control method of a multicore processor system including cores, a cache coherency mechanism establishing coherency among cache memories of the cores other than an arbitrary core when data is written into a cache memory of the arbitrary core, and a device, a first core that is among the cores and detects an interrupt signal from the device executes first-writing into an area prescribing an interrupt flag in the cache memory of the first core, first data indicating detection of the interrupt signal, and notifying the cores, other than the first core, of an execution request for interrupt processing corresponding to the interrupt signal, consequent to the cache coherency mechanism establishing coherency among at least the cache memories of the cores other than the first core when the first data is written at the first-writing; and a second core that is among the cores other than the first core, maintains the first data written as the interrupt flag, and is notified of the execution request at the notifying executes the interrupt processing, and second-writing over the area prescribing the interrupt flag written in the cache memory of the second core, with second data indicating no-detection of the interrupt signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram of functions of the multicore processor system 100;

FIGS. 4A and 4B are schematic views for explaining execution of interrupt processing;

FIG. 5 is a flowchart of a driver setting process at the time of activation of the multicore processor system 100; and FIG. 6 is a flowchart of an interrupt control process.

DESCRIPTION OF EMBODIMENTS

Preferred embodiments of an interrupt control method, a multicore processor system, and an interrupt control program according to the present invention will be described in detail with reference to the accompanying drawings.

Figure 1:
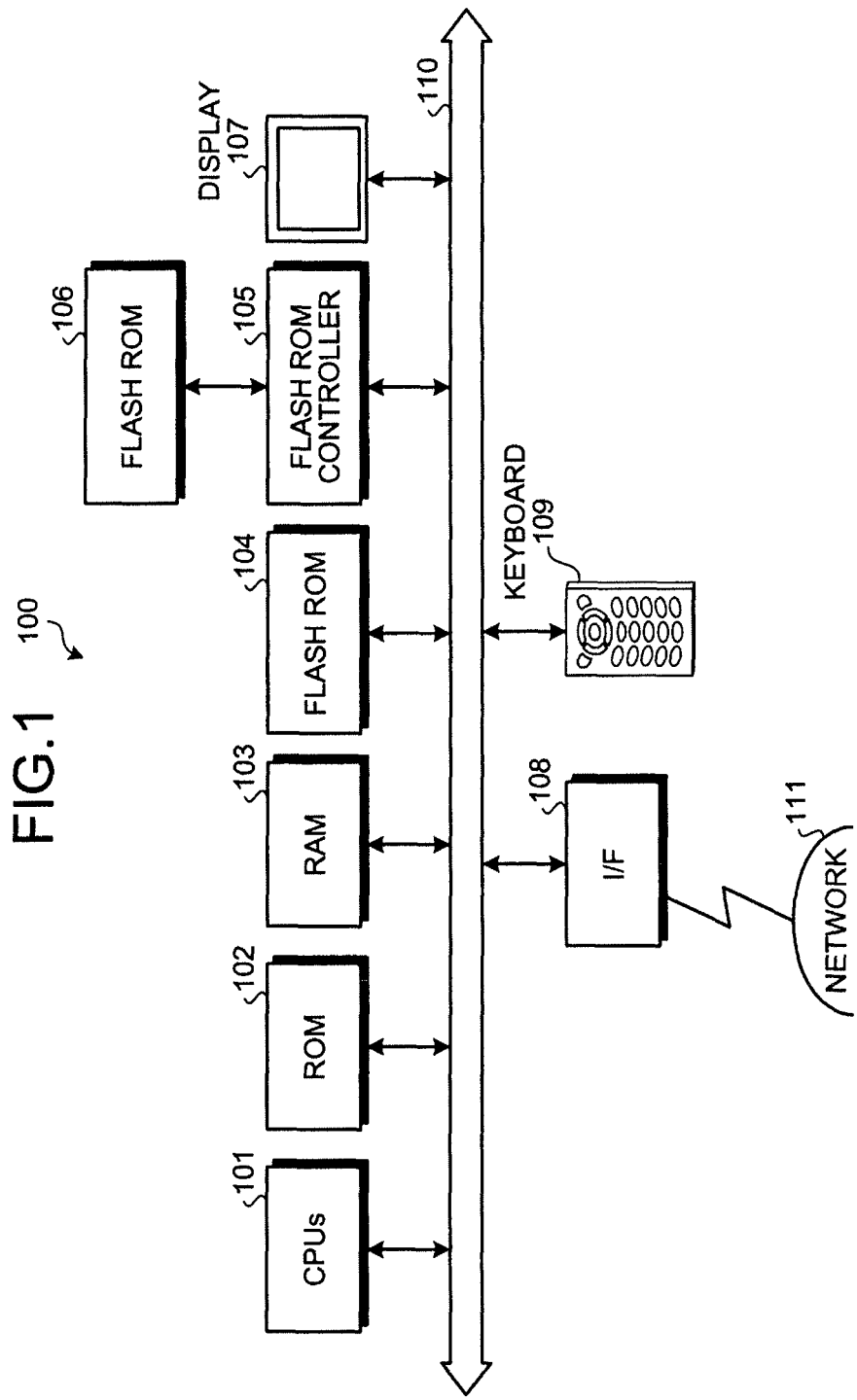
FIG. 1 is a block diagram of a hardware configuration of a multi-core processor system according to an embodiment.

FIG. 1 is a block diagram of a hardware configuration of a multi-core processor system according to the present embodiment. As depicted in FIG. 1, a multi-core processor system 100 includes multiple CPUs 101, read-only memory (ROM) 102, random access memory (RAM) 103, flash ROM 104, a flash ROM controller 105, and flash ROM 106. The multi-core processor system includes a display 107, an interface (I/F) 108, and a keyboard 109, as input/output devices for the user and other devices. The components of the multi-core system 100 are respectively connected by a bus 110.

The CPUs 101 govern overall control of the multi-core processor system 100. The CPUs 101 refer to CPUs that are single core processors connected in parallel. Details of the CPUs 101 will be described hereinafter with reference to FIG. 2. Further, the multi-core processor system 100 is a system of computers that include processors equipped with multiple cores. Provided that multiple cores are provided, implementation may be by a single processor equipped with multiple cores or a group of single-core processors in parallel. For the sake of convenience, in the present embodiments, description will be given taking a group of single-core processors in parallel as an example.

The ROM 102 stores therein programs such as a boot program. The RAM 103 is used as a work area of the CPUs 101. The flash ROM 104 stores system software such as an operating system (OS), and application software. For example, when the OS is updated, the multi-core processor system 100 receives a new OS via the I/F 108 and updates the old OS that is stored in the flash ROM 104 with the new OS.

The flash ROM controller 105, under the control of the CPUs 101, controls the reading and writing of data with respect to the flash ROM 106. The flash ROM 106 stores therein data written under control of the flash ROM controller 105. Examples of the data include image data and video data obtained by the user of the multi-core processor system through the I/F 108. A memory card, SD card and the like may be adopted as the flash ROM 106.

The display 107 displays, for example, data such as text, images, functional information, etc., in addition to a cursor, icons, and/or tool boxes. A thin-film-transistor (TFT) liquid crystal display and the like may be employed as the display 107.

The I/F 108 is connected to a network 111 such as a local area network (LAN), a wide area network (WAN), and the Internet through a communication line and is connected to other apparatuses through the network 111. The I/F 108 administers an internal interface with the network 111 and controls the input and output of data with respect to external apparatuses. For example, a modem or a LAN adaptor may be employed as the I/F 108.

The keyboard 109 includes, for example, keys for inputting letters, numerals, and various instructions and performs the input of data. Alternatively, a touch-panel-type input pad or numeric keypad, etc. may be adopted.

Figure 2:
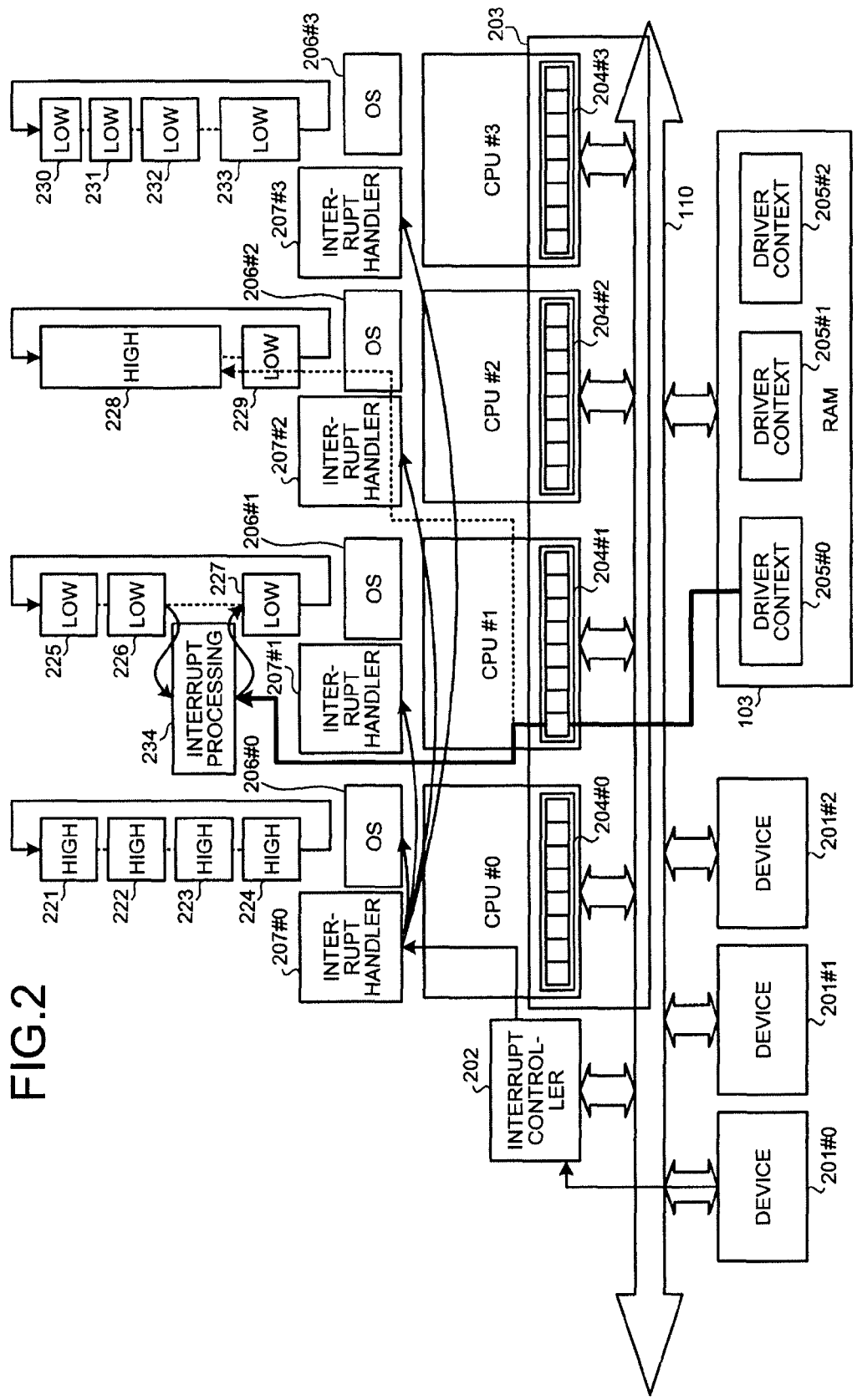
FIG. 2 is a block diagram of a portion of hardware, a data structure, and software of a multicore processor system 100.

FIG. 2 is a block diagram of a portion of hardware, a data structure, and software of the multicore processor system 100. The hardware depicted in FIG. 2 includes the RAM 103, devices 201#0 to 201#2, an interrupt controller 202, a cache coherency mechanism 203, and CPUs #0 to #3 included in the CPUs 101. The RAM 103, the devices 201#0 to 201#2, the interrupt controller 202, the cache coherency mechanism 203, and the CPUs #0 to #3 are connected through the bus 110.

The CPUs #0 to #3 have cache memories respectively accessed by each of the CPUs #0 to #3. In this embodiment, the CPU #0 acts as a master CPU to generally control the multicore processor 100 and the CPUs #1 to #3 act as slave CPUs subordinate to the CPU #0.

The devices 201#0 to 201#2 are hardware that is peripheral equipment connected to the multicore processor system 100 and are the display 107 and the keyboard 109, for example. The interrupt controller 202 receives interrupt signals from the devices 201#0 to 201#2 and notifies the CPU #0, which is the master CPU. The interrupt controller 202 notifies the CPU #0 of the interrupt signals based on the priority of the devices 201#0 to 201#2.

The cache coherency mechanism 203 establishes coherency of the cache memories of the CPUs to make the cache memories consistent. For example, if the CPU #0 writes a value into the cache memory, the cache coherency mechanism 203 reflects the value on the cache memories of the CPUs #1 to #3. If the CPU #0 writes a value into the cache memory, the cache coherency mechanism 203 may reflect the value on the cache memories of the CPUs #1 to #3 when the CPUs #1 to #3 access the corresponding value.

Specific examples of the cache coherency mechanism 203 include a snoop mode, a directory mode, a shared cache, etc. In the description of the present embodiment, as an example and not limited hereto, the cache coherency mechanism 203 is assumed to use the snoop mode.

A data structure depicted in FIG. 2 includes interrupt flag tables 204#0 to 204#3 and driver contexts 205#0 to 205#2. The interrupt flag tables 204#0 to 204#3 are tables storing an interrupt flag indicating whether an interrupt signal is detected from the devices 201#0 to 201#2 for each of the devices 201. For example, the interrupt flag tables 204 may have bitwise records in such a manner that a first bit records whether an interrupt signal has been received from the device 201#0 and the next bit records whether an interrupt signal has been received from the device 201#1.

The interrupt flag tables 204#0 to 204#3 are deployed in protected areas of the cache memories of the CPUs. The protected areas of the cache memories are areas of the cache memories other than areas that are used by processes assigned to the CPUs and in which data is replaced, and are areas where data is protected so as not to be erased.

For example, when an interrupt signal is received from the device 201#0, the CPU #0 writes "1" with an interrupt handler 207#0 into the first bit of the interrupt flag table 204#0 to record the reception of the interrupt signal. Hereinafter, data of the interrupt flag "1" indicates that the interrupt flag is ON and data of the interrupt flag "0" indicates that the interrupt flag is OFF. When the CPU #0 makes a record, the cache coherency mechanism 203 also turns on the first bits of the interrupt flag tables 204#1 to 204#3.

The driver contexts 205#0 to 205#2 are contexts used for executing interrupt processing from the devices 201#0 to 201#2 and are deployed on the RAM 103. For example, the driver context 205#0 stores a value of a register such as a program counter, a value of a temporary variable, etc., used in interrupt processing 234. The driver contexts 205 are generated for the respective devices 201. For example, the driver context 205#0 is the context of the device 201#0; the driver context 205#1 is the context of the device 201#1; and the driver context 205#2 is the context of the device 201#2.

A typical computer system has an interrupt vector table in which a number is assigned to a cause of interrupt and for each number, an address to a function acting as the interrupt processing corresponding to the number is stored. Therefore, the interrupt flag tables 204 may correlate the interrupt flags from the devices 201 in order of the number described in the interrupt vector table. For example, if interrupt from the device 201#0 is registered as No. 0 in the interrupt vector table, the first bits of the interrupt flag tables 204 may be assigned as the interrupt flag from the device 201#0. The driver contexts 205 may be generated from addresses of functions acting as the interrupt processing stored in the interrupt vector table.

Software depicted in FIG. 2 includes OSs 206#0 to 206#3, interrupt handlers 207#0 to 207#3, processes 221 to 233, and the interrupt processing 234. The OSs 206#0 to 206#3 are programs controlling the multicore processor system 100. For example, the OSs 206#0 to 206#3 provide libraries used by processes assigned to the CPUs #0 to #3. The OSs 206#0 to 206#3 execute scheduling processing of processes executed by the CPUs #0 to #3. For example, the OSs 206#0 to 206#3 switch executed processes each time a specified time slice expires.

The interrupt handlers 207#0 to 207#3 are programs running on the OSs 206#0 to 206#3 and are executed when an interrupt signal is received. The processes 221 to 224 are high-priority processes executed by the CPU #0. The processes 225 to 227 are low-priority processes executed by the CPU #1. The process 228 is a high-priority process executed by the CPU #2 and the process 229 is a low-priority process executed by the CPU #2. The processes 230 to 233 are low-priority processes executed by the CPU #3. During the execution of a high-priority process, interrupt processing is not executed due to interrupt disable setting, etc.

For example, the interrupt handler 207#0 is called when the CPU #0 receives an interrupt signal of the device 201#0 and writes Flag-ON into the first bit of the interrupt flag table 204#0. After coherency is established for the interrupt flag table 204 into which Flag-On is written, the CPU #0 sends the CPUs #0 to #3 a software interrupt signal. It is assumed that the reception timing of the software interrupt signal is after the expiration of the time slice of the high-priority process 222 and during the execution of the high-priority process 223 in the CPU #0. Similarly, it is assumed that the reception timing is immediately before the expiration of the time slice of the low-priority process 226 in the CPU #1, during the execution of the high-priority process 228 in the CPU #2, and during the execution of the high-priority process 232 in the CPU #3.

The operation statuses of the CPUs at the time of reception of the software interrupt signal is as follows. Since the CPU #0 is executing the high-priority process 223, processing corresponding to the software interrupt signal is not immediately executed and the interrupt handler 207#0 is not called. Since the CPU #1 is executing the low-priority process 226, when the dispatch available time comes, the processing corresponding to the software interrupt signal is executed and the interrupt handler 207#1 is called.

Since the CPU #2 is executing the high-priority process 228, the processing corresponding to the software interrupt signal is not executed and therefore, the interrupt handler 207#2 is not immediately called. Once the time slice of the high-priority process 228 expires, the CPU #2 executes the processing corresponding to the software interrupt signal and executes the interrupt handler 207#2. Since the CPU #3 is executing the low-priority process 232, when the dispatch available time comes, the processing corresponding to the software interrupt signal is executed and the interrupt handler 207#3 is called. The called interrupt handlers 207#1 to 207#3 read the respective interrupt flag tables 204 to check whether the flag is ON.

From the example described above, it is assumed that the interrupt handler 207#1 accesses the interrupt flag tables 204 first among the interrupt handlers 207#0 to 207#3. The interrupt handler 207#1 determines that the first bit is ON and rewrites the first bit of the interrupt flag table 204#1 from ON to OFF. The interrupt handler 207#1 subsequently deploys the driver context 205#0 and executes the interrupt processing 234. Since the first bit of the interrupt flag tables 204#1 is rewritten from ON to OFF, the cache coherency mechanism 203 also rewrites the first bits of the interrupt flag tables other than the interrupt flag table 204#1 to OFF.

As a result, when the interrupt handler 207#0, the interrupt handler 207#2, and the interrupt handler 207#3 access the interrupt flag tables 204, the first bits are turned to OFF and therefore, the interrupt processing 234 is not executed. Consequently, the CPU #1 accessing the interrupt flag table 204 first executes the interrupt processing.

The functions of the multicore processor system 100 will be described. FIG. 3 is a block diagram of the functions of the multicore processor system 100. The multicore processor system 100 includes a writing unit 301, a notifying unit 302, a writing unit 303, an executing unit 304, a writing unit 305, an executing unit 306, and a discarding unit 307. Among the functional units, the writing unit 301 and the notifying unit 302 are functions as a master CPU and the writing unit 303 to the discarding unit 307 are functions as slave CPUs.

Functions (the writing unit 301 to the discarding unit 307) acting as a control unit are implemented by the CPUs #0 to #3 executing programs stored in storage devices. The storage devices are, for example, the ROM 102, the RAM 103, the flash ROM 104, and the flash ROM 106 depicted in FIG. 1. Alternatively, the functions may be implemented by another CPU executing the programs via the I/F 108. The multicore processor system 100 includes multiple cores and devices. The multiple cores are the CPUs #0 to #3. The devices are the devices 201#0 to 201#2. The multicore processor system 100 includes the cache coherency mechanism 203 and when data is written into a cache memory of an arbitrary core of the multiple cores, the cache coherency mechanism 203 establishes coherency among cache memories in cores other than the arbitrary core.

The writing unit 301 has a function of causing a first core detecting an interrupt signal from a device to write first data indicating the detection of the interrupt signal into an area prescribing an interrupt flag in the cache memory of the first core. The area prescribing the interrupt flag is an area storing the interrupt flag in the interrupt flag tables 204. The first data may be any data provided that the detection of the interrupt signal is indicated, and is data written as "1" in the interrupt flag of the interrupt flag tables 204, for example. The first data may be data written as "ON".

For example, the writing unit 301 causes the CPU #0 detecting the interrupt signal from the device 201#0 to write ON into the first bit of the interrupt flag table 204#1. For the written data, the cache coherency mechanism 203 establishes the coherency.

The notifying unit 302 has a function of making a notification of an execution request for interrupt processing corresponding to an interrupt signal from the first core to at least the other cores other than the first core. When the writing unit 301 writes the first data, the notifying unit 302 gives notification of the execution request after the cache coherency mechanism 203 establishes coherency among the cache memories of the other cores. The notifying unit 302 may notify the multiple cores of the execution request. Although notification of the execution request may be made by using any communication among cores, for example, the first core may give notification of the execution request through software interrupt.

For example, the multicore processor system 100 sets a given interrupt number of software interrupt as an execution request for interrupt processing corresponding to the interrupt signal to give notification of the software interrupt from the CPU #0 to the CPUs #1 to #3. The supplied execution request may be stored in the register, the cache memory, etc. of the CPU #0.

The writing unit 303 and the writing unit 305 have a function of causing a second core to write second data indicating no-detection of an interrupt signal over the area prescribing the interrupt flag written in the cache memory of the second core. The second core is a core that among the other cores exclusive of the first core, maintains the first data written as the interrupt flag and is notified of the execution request by the notifying unit 302. The second core may be a core that is among the cores, maintains the first data written as the interrupt flag, and is notified of the execution request by the notifying unit 302.

The second date may be any data different from the first data and indicating no-detection of an interrupt signal. For example, the second data is data written as "0" in the interrupt flag of the interrupt flag tables 204. The second data may be data written as "OFF".

For example, it is assumed that the CPUs #1 to #3 maintain the interrupt flag "ON" in each of the interrupt flag tables 204 and that the CPU receiving the software interrupt is the CPU #1. The writing unit 303 causes the CPU #1 to write "OFF" over the first bit of the interrupt flag table 204#1. The cache coherency mechanism 203 establishes the coherency with respect to the written data.

For example, it is assumed that while the executing unit 304 is executed by the CPU #1, the writing unit 301 detects an interrupt signal from the device 201#1 and writes "ON" in a second bit of the interrupt flag table 204#0. In this case, the writing unit 305 causes the CPU #2 to write "OFF" over the second bit of the interrupt flag table 204#2.

The executing unit 304 and the executing unit 306 have a function of causing the cores executing the writing unit 303 and the writing unit 305 to execute interrupt processing. For example, the CPU #1 executing the writing unit 303 deploys the driver context 205#0 and executes the interrupt processing. For example, the CPU #2 executing the writing unit 305 deploys the driver context 205#1 and executes the interrupt processing.

The discarding unit 307 has a function of causing a third core among the other cores excluding the first core and the second core among the multiple cores to discard the execution request supplied from the notifying unit 302. The discarding unit 307 is executed when the writing of the second data by the writing unit 303 and the writing unit 305 causes the cache coherency mechanism 203 to establish coherency and an interrupt flag of cache memories of the remaining cores is overwritten with the second data. The cache coherency mechanism 203 establishes coherency among the cache memories of the remaining cores, which are the multiple cores excluding the second core. The third core may be a core among the multiple cores excluding the second core.

Although the discarding unit 307 is a function of the CPU #3 in FIG. 3, the discarding unit 307 may be executed even in the CPUs #0 to #2 and is a function executed by a CPU not executing the interrupting processing by the executing unit 304 and the executing 306. For example, the discarding unit 307 causes the CPU #3 to discard the software interrupt supplied from the notifying unit 302. Information indicating the discarding may be stored in the register, the cache memory, etc. of the CPU #3.

Figure 4A:
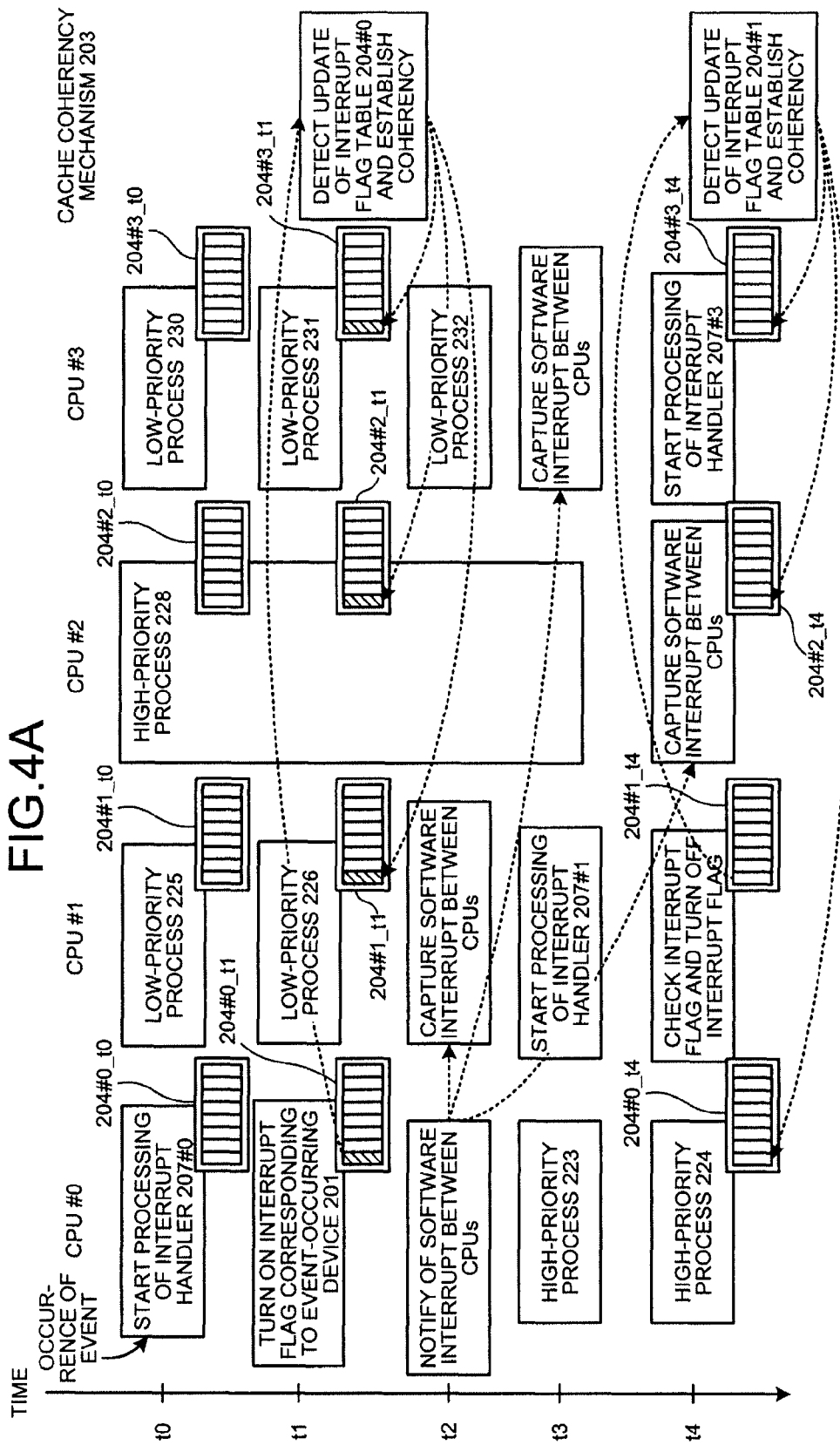

FIGS. 4A and 4B are schematic views for explaining execution of interrupt processing. In the description of FIGS. 4A and 4B, "_t0", "_t1", "_t4", and "_t7" appended to the reference numerals of the interrupt flag tables 204 indicate the interrupt flag tables 204 at time t0, time t1, time t4, and time t7.

At time t0, when the CPU #0 receives an interrupt signal from any one of the devices 201#0 to 201#2 through the interrupt controller 202, the CPU #0 considers that an event occurs and starts the processing of the interrupt handler 207#0. In the example of FIG. 4A, it is assumed that an interrupt signal is received from the device 201#0. At time t0, the CPU #1 is executing the low-priority process 225; the CPU #2 is executing the high-priority process 228; and the CPU #3 is executing the low-priority process 230. All the flags are OFF in the interrupt flag tables 204#0_t0 to 204#3_t0.

At time t1, the CPU #0 turns on the interrupt flag corresponding to the event-occurring device 201#0 in the interrupt flag table 204#0 with the interrupt handler 207#0. For example, the CPU #0 turns on the first bit of the interrupt flag table 204#0. As a result, the interrupt flag table 204#0_t1 is in a state in which the first bit is ON.

At time t1, the CPU #1 is executing the low-priority process 226; the CPU #2 continues executing the high-priority process 228; and the CPU #3 is executing the low-priority process 231. The cache coherency mechanism 203 detects an update of the interrupt flag table 204#0 and establishes coherency of the interrupt flag tables 204#0 to 204#3. For example, the cache coherency mechanism 203 turns on the first bits of the interrupt flag tables 204#1_t1 to 204#3_t1 such that the tables have the same value as the interrupt flag table 204#0_t1.

In some mechanisms employed as the cache coherency mechanism 203, after a cache memory of a given CPU is updated, at the time of access by another CPU, the mechanism makes an inquiry to all of the cache memories about value updates to establish coherency. For example, in the MESI protocol that is an invalid type protocol of the snoop mode, the interrupt flag is turned on only in the interrupt flag table 204#0 at the phase of time t1 and the other interrupt flag tables 204 have no value. At time t4 described later, the cache coherency mechanism 203 acquires a value from the interrupt flag table 204#0 in response to the access by the CPU #1 and turns on the interrupt flag in the interrupt flag table 204#1.

Alternatively, as described above, a mechanism detecting an update of a given CPU and immediately establishing coherency also exists. Although the cache coherency mechanism 203 according to this embodiment may be any mechanism, a mechanism detecting an update and immediately establishing coherency is used in this description for convenience.

At time t2, the CPU #0 notifies the CPUs #1 to #3 of software interrupt between CPUs. The CPU #0 may notify the CPU #0 itself of the software interrupt. Configuration may be such that the software interrupt is not transmitted to a CPU designed to be frequently assigned with high-priority processes, thereby preventing execution of high-priority processes from being delayed due to interrupt processing. In the example of FIG. 4A, the CPU #0 is frequently assigned with high-priority processes and therefore, the CPU #0 does not notify the CPU #0 itself of the software interrupt.

At time t2, the CPU #1 captures the software interrupt between CPUs and the CPU #2 continues executing the high-priority process 228. It is assumed that the CPU #3 is executing the low-priority process 232 before capturing the software interrupt.

At time t3, the CPU #0 executes the high-priority process 223. The CPU #1 starts the processing of the interrupt handler 207#1 in response to the software interrupt. The CPU #2 continues executing the high-priority process 228. The CPU #3 captures the software interrupt between CPUs.

At time t4, the CPU #0 executes the high-priority process 224. The CPU #1 checks whether the interrupt flag table 204#1 has an interrupt flag that is ON. In the example of FIG. 4A, since the first bit of the interrupt flag table 204#1 is turned on at time t1, the CPU #1 turns off the first bit. As a result, the interrupt flag table 204#0_t4 is in the state in which the first bit is OFF. At time t4, the CPU #2 captures the software interrupt between CPUs and the CPU #3 starts the processing of the interrupt handler 207#3.

The cache coherency mechanism 203 detects an update of the interrupt flag table 204#1 and establishes coherency of the interrupt flag tables 204#0 to 204#3. For example, the cache coherency mechanism 203 turns off the first bit of the interrupt flag table 204#0_t4 such that the table has the same value as the interrupt flag table 204#1_t4. The cache coherency mechanism 203 also turns off the first bits of the interrupt flag table 204#2_t4 and the interrupt flag table 204#3_t4.

At time t5, the CPU #0 executes the high-priority process 221. The CPU #1 executes the interrupt process corresponding to the interrupt flag that is ON at time t1. For example, the CPU #1 deploys the driver context 205#0 corresponding to the first bit to execute the interrupt processing 234. After the interrupt processing is completed, the CPU #1 executes a normal process at the next time. The CPU #2 starts the processing of the interrupt handler 207#2. The CPU #3 checks whether the interrupt flag table 204#3 has an interrupt flag that is ON. In the example of FIG. 4A, since all the bits are turned off in the interrupt flag table 204#3_t4, the CPU #3 does not execute the interrupt processing and executes a normal process at the next time.

At t6, when the CPU #0 receives an interrupt signal from any one of the devices 201#0 to 201#2 through the interrupt controller 202, the CPU #0 considers that an event occurs and starts the processing of the interrupt handler 207#0. In the example of FIG. 4B, it is assumed that the interrupt signal is received from the device 201#1. At time t6, the CPU #1 continues executing the interrupt processing 234; the CPU #2 checks whether the interrupt flag table 204#2 has an interrupt flag that is ON. In the example of FIG. 4A, since all the bits are turned off in the interrupt flag table 204#2_t4, the CPU #2 does not execute the interrupt processing and executes a normal process at the next time. The CPU #3 executes the low-priority process 233.

At time t7, by the interrupt handler 207#0, the CPU #0 turns on the interrupt flag corresponding to the event-occurring device 201 in the interrupt flag table 204#0. For example, the CPU #0 turns on the second bit of the interrupt flag table 204#0 corresponding to the device 201#1. As a result, the interrupt flag table 204#0_t7 is in a state in which the second bit is ON. The CPU #1 continues executing the interrupt processing 234. The CPU #2 executes the low-priority process 229. The CPU #3 executes the low-priority process 230.

The cache coherency mechanism 203 detects an update of the interrupt flag table 204#0 and establishes coherency of the interrupt flag tables 204#0 to 204#3. For example, the cache coherency mechanism 203 turns on the second bit of the interrupt flag table 204#1_t7 such that the table has the same value as the interrupt flag table 204#0_t7. The cache coherency mechanism 203 also turns on the second bits of the interrupt flag table 204#2_t7 and the interrupt flag table 204#3_t7.

At time t8, the CPU #0 notifies the CPUs #1 to #3 of software interrupt between CPUs. At time t8, the CPU #1 continues executing the interrupt processing 234. The CPU #2 captures the software interrupt between CPUs. It is assumed that the CPU #3 is executing the low-priority process 231 before capturing the software interrupt.

At time t9, the CPU #0 executes the high-priority process 222. The CPU #1 captures the software interrupt between CPUs. The CPU #2 starts the processing of the interrupt handler 207#2 in response to the software interrupt. The CPU #3 captures the software interrupt between CPUs.

Although the processing at subsequent times is not particularly depicted, the CPU #2 capturing the software interrupt between CPUs first executes the interrupt processing corresponding to the device 201#1. As described above, software interrupt is implemented and the CPU #1 accessing the interrupt flag table 204 first executes the interrupt processing. Therefore, since the CPU capable of starting the interrupt processing first executes the interrupt processing, the real-time performance can be improved.

It is assumed that after the event occurring at time to, interrupt is generated by the device 201#1, which is a device different from the device 201#0 generating the interrupt at time t6 in the example of FIG. 4B. In this case, the CPU #2 executing processing other than the interrupt processing of the device 201#0 and a high-priority process accesses the interrupt flag table 204 in response to the software interrupt between CPUs first and executes the interrupt processing of the device 201#1. As described above, CPUs executing device processing can be distributed to avoid heavy concentration of load.

To implement the interrupt processing depicted in FIGS. 4A and 4B, the multicore processor system 100 executes flowcharts of FIGS. 5 and 6 described below. FIG. 5 depicts a driver setting process at the time of activation of the multicore processor system 100. FIG. 6 depicts processing after the completion of the activation of the multicore processor system 100 when the devices 201#0 to 201#2 give notification of an interrupt signal consequent to the occurrence of an event while processes are executed based on time slices, etc. under normal operation.

FIG. 5 is a flowchart of the driver setting process at the time of activation of the multicore processor system 100. The flowchart depicted in FIG. 5 is a flowchart when the master CPU is the CPU #0 and the slave CPUs are the CPUs #1 to #3. The CPU #0 executes a boot process (step S501). In the boot process, the CPU #0 deploys the memory images of the OSs 206#0 to 206#3 onto the RAM 103. After the deployment, the CPU #0 activates a kernel (step S502) and the CPUs #1 to #3 also activate kernels (step S503).

Hereinafter, the flowchart of the slave CPUs will be described in terms of the CPU #1 for simplicity of description. The interrupt handler 207 in the process at step S510 and the interrupt flag table 204 in the process at step S512 do not have suffixes "#1" to "#3" in the flowchart depicted in FIG. 5, meaning the correlation to each of the CPUs #1 to #3. However, since the CPU #1 is described in the following description, the interrupt handler 207 and the interrupt flag table 204 are described as the interrupt handler 207#1 and the interrupt flag table 204#1.

The CPU #0 determines whether all the drivers are activated (step S504). If a non-activated driver is present (step S504: NO), the CPU #0 ensures the driver context 205 for the non-activated driver (step S505). Thereafter, the CPU #0 notifies the CPUs #1 to #3 of the address of the driver context 205 (step S506). After the notification, the CPU #0 sets the ensured driver context 205 in the interrupt handler 207#0 (step S507) and proceeds to the process at step S504.

The CPU #1 determines whether all the driver contexts 205 have been set (step S508). If not all the driver contexts 205 have been set (step S508: NO), the CPU #1 acquires the address of the driver context 205 received from the CPU #0 at step S506 (step S509). After the acquisition, the CPU #1 sets the acquired driver context 205 in the interrupt handler 207#1 (step S510) and proceeds to the process at step S508.

If all the drivers have been activated (step S504: YES), the CPU #0 ensures the interrupt flag table 204#0 on the cache protected area (step S511) and terminates the driver setting process. If all the driver contexts 205 have been set (step S508: YES), the CPU #1 ensures the interrupt flag table 204#1 on the cache protected area (step S512) and terminates the driver setting process.

FIG. 6 is a flowchart of an interrupt control process. In the flowchart depicted in FIG. 6, the master CPU is the CPU #0 and the slave CPUs are the CPUs #1 to #3 as is the case with FIG. 5. For simplicity of description, the flowchart of the slave CPUs will be described in terms of the CPU #1. The interrupt handler 207 in the process at step S608 and the interrupt flag table 204 in the process at step S609 do not have suffixes "#1" to "#3" in the flowchart depicted in FIG. 6, meaning the correlation to each of the CPUs #1 to #3. However, since the CPU #1 is described in the following description, the interrupt handler 207 and the interrupt flag table 204 are described as the interrupt handler 207#1 and the interrupt flag table 204#1.

The CPU #0 determines whether the occurrence of an event from the devices 201#0 to 201#2 has been detected (step S601). If occurrence of an event has not been detected (step S601: NO), the CPU #0 dispatches a process under normal operation (step S602) and proceeds to the process at step S601.

If the occurrence of an event has been detected (step S601: YES), the CPU #0 starts the processing of the interrupt handler 207#0 (step S603). For example, the CPU #0 saves a process under execution to the context area of the process such that the interrupt handler 207#0 can be executed. The CPU #0 subsequently writes "ON" into the interrupt flag corresponding to the event-occurring device 201 in the interrupt flag table 204#0 as the processing of the interrupt handler 207#0 (step S604). After the writing, the CPU #0 notifies the CPUs #1 to #3 of software interrupt between CPUs, serving as an execution request for interrupt processing (step S605) and proceeds to the process at step S601.

The CPU #1 determines whether a software interrupt between CPUs has been captured (step S606). If a software interrupt between CPUs has not been captured (step S606: NO), the CPU #1 dispatches a process under normal operation (step S607) and proceeds to the process at step S606.

If a software interrupt between CPUs has been captured by the notification from the CPU #0 at step S605 (step S606: YES), the CPU #1 starts the processing of the interrupt handler 207#1 (step S608). The CPU #1 subsequently determines whether the interrupt flag table 204#1 has an interrupt flag that is ON as the processing of the interrupt handler 207#1 (step S609).

If all the flags are OFF (step S609: NO), the CPU #1 discards the execution request for the interrupt processing and proceeds to the process at step S606. If an interrupt flag that is ON is present (step S609: YES), the CPU #1 writes "OFF" into the corresponding interrupt flag (step S610). Before the process at step S610, the CPU #1 stores the address, etc. of the interrupt flag that is ON into the register, etc. to store indication of which interrupt flag is ON. After the writing, the CPU #1 executes the interrupt processing corresponding to the interrupt flag that was ON (step S611) and proceeds to the process at step S606.

As described, according to the interrupt control method, the multicore processor system, and the interrupt control program, a first core acting as a master turns on an interrupt flag in a coherency area, and a second core that is among the other cores and has turned off the interrupt flag executes the interrupt processing. As a result, the multicore processor system can allow the second core, which is capable of execution first, to execute the interrupt processing and can improve response performance.

When detecting an interrupt signal from another device while the second core is executing the interrupt processing, the multicore processor system turns on another interrupt flag, and a core turning the flag from ON to OFF executes the interrupt processing corresponding to the interrupt signal from the other device. As described, the multicore processor system can distribute the interrupt processing to multiple cores for execution. Among cores executing normal processes, the interrupt processing can be distributed to a core capable of immediately responding to software interrupt at the time point of reception, without disturbing the operations of the processes.

In the multicore processor system, a third core of the multiple cores excluding the first and second cores may discard a supplied execution request. As a result, exclusion control is provided such that the interrupt processing is not executed by a core that has been notified of the execution request, other than the second core capable of executing the interrupt processing first, and multiple execution of the interrupt processing can be prevented. With regard to the exclusive control, since the exclusive control is provided by utilizing the cache coherence mechanism, a time cost required for the exclusive control can be reduced as compared to the exclusive control using the semaphore mechanism of OS provided in the technique according to Japanese Laid-Open Patent Publication No. 2008-140191.

The multicore processor system may notify the multiple cores including the first core acting as the master of the execution request for interrupt processing. As a result, the multicore processor can define the master CPU as an executor of the interrupt processing if the load of the CPU is low. Even if the number of cores is two when the master CPU has one slave CPU, the interrupt processing can be distributed.

The multicore processor system can allow the core capable of starting the interrupt process first to execute the interrupt processing, thereby reducing the time from the occurrence of an event to an operation response particularly in single-operation type drivers, among device drivers executing the interrupt processing. Since continuous-operation type drivers often have a deadline, the start of execution can be predicted based on the deadline. However, since the single-operation type drivers have no time period used as a reference and execute processing as fast as possible in many cases, this embodiment allowing a core capable of starting first to execute the interrupt processing is effective.

The interrupt control method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The interrupt control method, the multicore processor system, and the interrupt control program enable interrupt processing to be executed by a core capable of executing the interrupt processing first to improve response performance and to distribute the load of the interrupt processing.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An interrupt control method of a multicore processor system comprising a plurality of cores, a cache coherency mechanism establishing coherency among cache memories of the cores other than an arbitrary core when data is written into a cache memory of the arbitrary core, and a device, wherein
    a first core that is among the cores and detects an interrupt signal from the device executes
        first-writing into an area prescribing an interrupt flag in the cache memory of the first core, first data indicating detection of the interrupt signal, and
        notifying the cores, other than the first core, of an execution request for interrupt processing corresponding to the interrupt signal, consequent to the cache coherency mechanism establishing coherency among at least the cache memories of the cores other than the first core when the first data is written at the first-writing; and
    a second core that is among the cores other than the first core, maintains the first data written as the interrupt flag, and is notified of the execution request at the notifying executes
        the interrupt processing, and
        second-writing over the area prescribing the interrupt flag written in the cache memory of the second core, with second data indicating no-detection of the interrupt signal.

2. The interrupt control method according to claim 1, wherein
    a third core that is among the cores other than the second core executes
    discarding the execution request notified at the notifying, when in the cache memories of the cores other than the second core, the interrupt flag is overwritten with the second data consequent to the cache coherency mechanism establishing coherency among the cache memories of the cores other than the second core when the second data is written at the second-writing.

3. The interrupt control method according to claim 2, wherein
    the notifying includes notifying the cores of an execution request for interrupt processing corresponding to the interrupt signal, consequent to the cache coherency mechanism establishing coherency among at least the cache memories of the cores other than the first core when the first data is written at the first-writing,
    the second core is among the cores, maintains the first data written as the interrupt flag, and is notified of the execution request at the notifying, and
    the third core is among the cores other than the second core.

4. A multicore processor system having a plurality of cores, a cache coherency mechanism establishing coherency among cache memories of the cores other than an arbitrary core when data is written into a cache memory of the arbitrary core, and a device, the multicore processor system comprising:
    a first core that is among the cores, has detect an interrupt signal from the device, and is configured to:
        write first data indicating detection of the interrupt signal into an area prescribing an interrupt flag in a cache memory of the first core, and
        notify the cores, other than the first core, of an execution request for interrupt processing corresponding to the interrupt signal, consequent to the cache coherency mechanism establishing coherency among at least the cache memories of the cores other than the first core when the first data is written; and
    a second core that is among the core other than the first core, maintains the first data written as the interrupt flag, is notified of the execution request by the first core, and is configured to:
        execute the interrupt processing, and
        write over the area prescribing the interrupt flag written in the cache memory of the second core, with second data indicating no-detection of the interrupt signal.

5. A computer-readable recording medium storing a program for interrupt control of a multicore processor system comprising a plurality of cores, a cache coherency mechanism establishing coherency among cache memories of the cores other than an arbitrary core when data is written into a cache memory of the arbitrary core, and a device, the program causing
    a first core that is among the cores and detects an interrupt signal from the device to execute a process comprising:
        first-writing into an area prescribing an interrupt flag in the cache memory of the first core, first data indicating detection of the interrupt signal, and
        notifying the cores, other than the first core, of an execution request for interrupt processing corresponding to the interrupt signal, consequent to the cache coherency mechanism establishing coherency among at least the cache memories of the cores other than the first core when the first data is written at the first-writing; and
    a second core that is among the cores other than the first core, maintains the first data written as the interrupt flag, and is notified of the execution request at the notifying to execute a process comprising:
        executing the interrupt processing, and
        second-writing over the area prescribing the interrupt flag written in the cache memory of the second core, with second data indicating no-detection of the interrupt signal.

* * * * *